2,842,438

COPPER-ZIRCONIUM ALLOYS

Matti J. Saarivirta, Plainfield, and Alfred E. Beck, Jr., Rumson, N. J., assignors to American Metal Climax, Inc., a corporation of New York No Drawing. Application August 2, 1956
Serial No. 601,631

8 Claims. (Cl. 75—153)

This invention relates to copper-base alloys and relates more particularly to copper-zirconium compositions consisting of oxygen-free copper alloyed with minimal amounts of zirconium. The alloys of this invention possess improved properties and characteristics particularly with respect to the combination of superior resistance to softening at elevated temperatures and high electrical conductivity. These properties are of utmost importance for use in the manufacture of electrical and electronic components or elements such as commutators for motors and generators, welding electrodes, wires, electrical connections and the like requiring conductor materials capable of withstanding high temperatures over prolonged periods of operation without appreciable loss in physical and mechanical strength.

Copper alloys of various types have been heretofore employed with varying degrees of success for the above and related applications. Silver-bearing copper, for example, has been used heretofore rather extensively in the manufacture of commutators and other components for electrical applications. With progressively increasing temperature requirements being encountered particularly in connection with aircraft developments, however, the resistance of silver-bearing copper to softening at the elevated temperatures has been found to be inadequate causing distortion of the conductor material resulting in failure within a relatively short period.

Although other copper alloys such as copper-chromium, copper-cadmium improved with zirconium, among others have also been previously suggested and used for high temperature applications, the need for copper alloys possessing adequate strength, hardness, ductility and electrical conductivity and particularly the combination of high electrical conductivity with sufficient resistance to softening at temperatures between 300 to 500° C. has not been met in an entirely satisfactory manner. Copper-chromium, though useful at somewhat higher temperatures than copper-silver, is extremely difficult to cast and requires extremely careful processing which is expensive and time-consuming.

The hardening effect of zirconium upon its addition to copper is well known and in the prior art various binary, ternary and quaternary copper-base alloys are described. In general, the extent of hardening and improved high temperature properties which may be obtained by zirconium addition is dependent upon the quantity of zirconium and the specific processing steps used in preparing the alloy. Since electrical conductivity is adversely affected by increased amounts of zirconium, it is usually desirable to keep the concentration of zirconium as low as possible when maximum electrical conductivity is of principal importance.

Notwithstanding the known adverse effect of zirconium in copper on the electrical conductivity of the resulting alloys, the use of zirconium in amounts ranging from 1 to 5% or more has been common practice in the making of copper-zirconium conductor materials. Where smaller amounts of zirconium have been previously employed, the copper-base alloys involved are generally of the ternary or quaternary type although the use of quantities down to 0.1% by weight has been previously described for the binary alloy of tough-pitch copper.

It has now been discovered that with the use of oxygen-free copper as the alloy base, the maximum solubility of zirconium metal is very close to 0.15% by weight and alloys of copper and zirconium with zirconium contents varying from 0.01 or even less up to 0.15% (i. e. within the limits of the solid solubility of zirconium in oxygen-free copper) can be made possessing exceptionally good properties. In the higher zirconium content alloys, some $Cu_3Zr$-rich areas remain at the grain boundaries providing an objectionable second phase which lead to unsoundness in the metal as well as various processing complications and difficulties. In addition to superior electrical conductivity resulting from the use of smaller amounts of zirconium, the alloys of the present invention upon suitable processing have exceptional resistance to softening or recrystallization at elevated temperatures and further minimize hot-shortness and directionality difficulties usually encountered at the higher zirconium concentrations.

It is, therefore, an object of this invention to provide copper-zirconium alloys which possess improved electrical conductivity and superior thermal and mechanical properties.

It is another object to provide copper-zirconium alloys of good hot and cold workability characteristics containing minimal quantities of zirconium whereby an objectionable second phase in the heat treated alloy is avoided.

Another object is to provide copper-zirconium alloys which may be cast more easily and cheaply by virtue of the smaller amounts of zirconium used for forming the binary alloy.

A further object is to provide copper-zirconium compositions which have improved fabrication properties compared to similar binary alloys having a substantially larger zirconium content.

Other objects and advantages will become apparent as this specification proceeds.

The copper suitable for use in accordance with the present invention referred to herein as "oxygen-free copper" is readily recognizable by those skilled in the art as meaning a high purity copper which has been substantially freed of its oxygen content by any of the known methods employed for the purpose. Although copper which has been produced in a reducing atmosphere such as "OFHC" brand copper provides excellent results, copper prepared in an inert atmosphere or in a vacuum may also be used.

In order to provide alloys of zirconium and oxygen-free copper having the desired electrical and mechanical properties in accordance with the present invention, the amount of zirconium may be varied from 0.01 to 0.15% by weight and the desired amount may be added to the oxygen-free copper in the form of zirconium metal, a zirconium-copper master alloy or in any other suitable manner following conventional procedures. Considerable improvement in softening temperature may be obtained with the use of even smaller amounts of zirconium as, for example, with the use of only 0.003% zirconium the softening temperature of the copper may be raised from 230° C. to approximately 310° C. which exceeds the value for silver-bearing copper previously mentioned.

The oxygen-free copper-zirconium alloys which have from 0.01 or even less to 0.15% zirconium and preferably from 0.02 to 0.10% may be readily cast to form sound ingots exhibiting good hot and cold workability. In casting alloys where the zirconium content is above 0.15%, there is a marked tendency for the zirconium to segregate causing grain boundary cracking whereby unsound castings are produced.

The alloys prepared with 0.15% or less zirconium have very good pouring qualities and ingots made therewith can be fabricated satisfactorily into any desired form. With a sufficient amount of zirconium within the designated range, the oxygen-free copper alloys treated as hereinafter described possess excellent electrical and mechanical properties including a softening point which is substantially higher than those of any commercially available copper alloys heretofore used for commutators or similar applications.

In determining the solid solubility of zirconium in oxygen-free copper, maximum solubility was found to occur at about 980° C., the amount being 0.15% as previously indicated. At 1020° C., the solubility decreased to about 0.10% and at lower temperatures the solubility diminished substantially as follows:

| Temp., °C. | Solid sol. of Zr (percent by wt.) |
|---|---|
| 950 | 0.13. |
| 900 | 0.10. |
| 840 | 0.07. |
| 700 | 0.019. |
| below 700 | less than 0.011. |

The cast structure of the Cu–Zr alloys containing about 0.02% or more zirconium consists of alpha solid solution and a $Cu_3Zr$ phase whereas those of lower concentrations consist only of the alpha phase. When the alloy containing the two phases is heated to a temperature at which all the zirconium is soluble and then quenched, a homogeneous structure consisting only of the alpha phase is obtained providing the maximum solubility value of 0.15% is not exceeded. It is apparent from the foregoing solubility data that the alloys of this invention may be solution heat treated by heating between 700 to about 1000° C., depending upon the amounts of zirconium used in the alloy.

The solution heat treating time may be varied considerably but about one hour is generally quite satisfactory. Quenching or quickly cooling the solution heat treated casting containing between 0.02 and 0.15% zirconium from its solution heat treating temperature, and then reheating the same to temperatures below the solubility limit as, for example, between 300 to 600° C. causes the zirconium in the supersaturated solid solution to precipitate as very fine particles of $Cu_3Zr$. This aging step commonly referred to as "precipitation hardening" or "precipitation heat treatment" is preferably carried out by heating to about 500° C. for a period of about one hour whereby the combination of maximum hardening and electrical conductivity can be attained though longer or shorter aging periods may be used. When cold working is included as an intermediate processing step, optimum precipitation heat treating results are obtained by aging at about 350° C. for one hour.

The intermediate cold working step mentioned above may be utilized to advantage with the alloys of this invention particularly in the treatment of the alloys containing from 0.01 to 0.10% zirconium. These alloys processed by solution heat treatment and quenching in cold water followed by cold working and subsequent precipitation heat treatment to develop maximum hardness and conductivity possess excellent resistance to softening at relatively high temperatures. Although they are precipitation hardenable to a lesser extent than similar alloys of higher zirconium content, improvements in tensile strength and hardness are nevertheless obtained with a simultaneous improvement of the electrical conductivity which is increased, for example, from 80 to 94% I. A. C. S. by aging at 350° C. for one hour.

The alloys containing above 0.10% and not in excess of 0.15% zirconium may be processed by either of two methods which produce somewhat different results. When high tensile strength and hardness are of prime importance, it has been found that the alloy should be cold worked between solution and precipitation heat treatments. In this condition, the alloys have somewhat better resistance to softening at elevated temperatures than the alloys with zirconium contents below 0.10% but their electrical conductivity is relatively lower, increasing, for example, from 75 to 80% I. A. C. S. after aging at 350° C. When very good resistance to softening at elevated temperature and high electrical conductivity are required, the alloys should not be subjected to any amount of working between the solution and the precipitation heat treatment steps. In this condition, the alloys possess exceptionally good resistance to temperatures of about 500° C. with electrical conductivity being approximately 90% I. A. C. S. Although tensile strength is only slightly increased by aging over that of the solution heat treated material, the hardness may be increased by as much as 100%.

Alloys of the type herein described containing from 0.02 to 0.15% zirconium subjected to solution heat treatment at 980° C. and quenched in water retain the zirconium in supersaturated solid solution. Precipitation heat treatment of this material at temperatures ranging from 400 to 600° C. increases the hardness values from 35–45 VPN to 60–83 VPN and tensile strengths from 32,000 p. s. i. to 35,000–37,000 p. s. i. Elongation decreases from 44 to 9–13.5% and electrical conductivity increases to 92–96 I. A. C. S. during the precipitation heat treatment.

The above solution heat treated and precipitation hardened alloys can be held for over 100 hours at 500° C. with practically no loss in room temperature hardness. After 250 hours at 500° C., the hardness of the higher zirconium content alloys begins to decrease. If the alloys are cold worked after precipitation heat treatment, the tensile strength is increased to 53,000–55,000 p. s. i. but decreases to 49,000–53,000 p. s. i. upon annealing for one hour at 500° C.

The maximum mechanical properties of these copper-zirconium alloys are obtained when they are cold worked after solution heat treatment but before precipitation heat treatment. A cold reduction of 90% in area coupled with a one hour precipitation heat treatment at 350° C. increases tensile strength to about 70,000, for example, in alloys containing 0.13 to 0.15% zirconium. With such high tensile strengths, elongations of about 10%, hardness values of 130 to 150 VPN and electrical conductivities of 75 to 80 I. A. C. S. are obtained.

Specific embodiments of the invention are illustrated in the following examples setting forth the solid solubility observations and the data for alloys of varying zirconium content relative to softening point, tensile strength, elongation, hardness and electrical conductivity obtained under various treatment procedures. The percentages indicated in connection with alloy compositions are by weight:

*Example I*

Oxygen-free copper of the following analysis

| S, percent | Pb, percent | Sb, percent | Bi, percent | Sn, percent | Fe, percent | Ni, percent | Mn, percent | $O_2$, percent |
|---|---|---|---|---|---|---|---|---|
| .002 | .0003 | <.0005 | <.0001 | <.0001 | .0005 | .0006 | <.00005 | nil |

was used in casting 4 x 4 inch wirebars having a zirconium content as listed below. In each case a master alloy containing 30% zirconium and 70% copper was used in appropriate quantities and a protective atmosphere of CO gas was used throughout the alloying and casting procedure. The approximate softening temperature of each alloy subjected to solution heat treatment at 1000° C. for one hour and cold working to a 90% reduction in area is given below together with the values of oxygen-free copper and silver bearing oxygen-free copper included for comparison purposes.

| Alloy No. | Percent Zirconium | Softening Temp., °C. |
|---|---|---|
| 1 | 0.15 | 590 |
| 2 | 0.13 | 590 |
| 3 | 0.10 | 580 |
| 4 | 0.07 | 560 |
| 5 | 0.019 | 520 |
| 6 | 0.011 | 440 |
| 7 | 0.003 | 310 |
| Oxygen-free copper | 0.0 | 230 |
| Oxygen-free copper+silver | 0.0 | 300 |

The significant improvement in the resistance to softening by extremely small amounts of zirconium may be readily seen from the above, it being noted that as little as .011% zirconium is sufficient to raise the softening temperature of oxygen-free copper by about 210° C. with only 0.003% zirconium present, it is rather surprising that the softening temperature is raised by about 80° C.

*Example II*

The specimens used to determine the solid solubility of zirconium in copper were prepared by preheating cast samples in a charcoal bed at 900° C. for ½ hour and hot and cold rolling to ¼" rod. The rods were then cut into ⅔ inch long specimens which were solution heat treated for six hours at 1020, 980 and 950° C. and quenched in cold water. To find the solid solubility at lower temperatures the specimens which were solution annealed at 1020° C. containing 0.10% or less zirconium were reannealed at the designated temperature for one hour and quenched in cold water. The specimens for microscopic examination were prepared by grinding, mechanically polishing and finally electropolishing in a 33% phosphoric acid solution. Some of the specimens were examined after polishing while others were etched with 92:1 $NH_4OH$—$H_2O_2$ solution and then examined. In most cases the polishing alone was sufficient to delineate the structure.

When the specimens of all the alloys were solution heat treated at 1020° C. for six hours and quenched, it was observed by microscopic examination that the $Cu_3Zr$ phase dissolved completely in the alloys containing 0.10% and less zirconium, whereas the alloys containing 0.13% and more zirconium contained both alpha and $Cu_3Zr$ phases. The results obtained on the specimens which were solution heat treated for 6 hours at 980° C. and quenched indicate that the solubility limit at this temperature is close to 0.15% as the $Cu_3Zr$ phase was completely dissolved in the alloys containing 0.15% zirconium or less whereas those with a higher zirconium content showed the presence of the $Cu_3Zr$ phase at the grain boundaries. At 950° C., the solid solubility was close to 0.13% zirconium.

When the alloy containing 0.10% zirconium was solution heat treated at 1020° C. for six hours then quenched and reheated at various lower temperatures for one hour, it was found that precipitation of $Cu_3Zr$ started at 900° C. indicating that the solid solubility at that temperature is close to 0.10% zirconium. Using the same procedure, the solubility limits at lower temperatures previously set forth herein were determined.

*Example III*

In a typical procedure for making the oxygen-free copper-zirconium alloys, 4 x 4" wirebars were made using either continuous casting or casting into water cooled molds. An induction furnace was used with CO gas being used as a reducing atmosphere throughout the alloying and casting procedure. The oxygen-free copper was melted and heated to 2140–2200° F. at which temperature the master alloy was added in sufficient quantity to provide the desired zirconium content in the alloy. For example, with a charge of 288.7 pounds of copper, 1.3 pounds of a master alloy containing 33% Zr is used in making copper-zirconium alloy having a zirconium content of 0.15%. After about two minutes of alloying, the melt was stirred with a graphite rod and five to eight minutes later the melt was cast at 2200–2300° F. Boneblack and silicones were added to the molds prior to casting.

Some physical and mechanical properties of representative oxygen-free copper-zirconium alloys hot rolled to 0.25" rod and subsequently treated as described are given below inclusive of tensile strength (p. s. i.), elongation (percent in two inches), Vickers pyramid hardness (VPN) kg. per mm.², and electrical conductivity (I. A. C. S.).

A. 0.25" rod-solution heat treated at 1020° C. for 6 hours, quenched and precipitation heat treated at various temperatures for one hour and quenched.

HARDNESS (VPN)

| Temp. (° C.) | Zirconium content of alloy (percent) | | | | | | |
|---|---|---|---|---|---|---|---|
| | 0.15 | 0.13 | 0.10 | 0.07 | 0.019 | 0.011 | 0.003 |
| 1,020 | 44.0 | 43.0 | 40.6 | 37.7 | 36.0 | 35.5 | 35.5 |
| 764 | ------ | 57.5 | 48.9 | 40.5 | 39.1 | 40.1 | ------ |
| 650 | ------ | ------ | ------ | ------ | ------ | 43.0 | ------ |
| 600 | 70.9 | 70.3 | 57.5 | 55.8 | 47.5 | 42.0 | ------ |
| 500 | 82.2 | 83.7 | 71.0 | 58.3 | 47.6 | 43.5 | ------ |
| 450 | ------ | ------ | 58.5 | 48.3 | 44.2 | 43.5 | ------ |
| 400 | 51.1 | 48.6 | 47.7 | 46.7 | 47.6 | 43.1 | ------ |
| 300 | 45.4 | 51.2 | 45.0 | 43.0 | 43.8 | 43.8 | ------ |
| 200 | 45.5 | 43.0 | 44.5 | 40.0 | 43.5 | 37.8 | 37.8 |

B. 0.25" rod-solution heat treated at 1020° C. for 6 hours, quenched and precipitation heat treated at 500° C. for 1, 48, 120, and 264 hrs.

HARDNESS (VPN)

| Time (hrs.) | Zirconium content of alloy (percent) | | | | | |
|---|---|---|---|---|---|---|
| | 0.15 | 0.13 | 0.10 | 0.07 | 0.019 | 0.011 |
| 1 | 82.2 | 83.7 | 71.0 | 58.3 | 47.6 | 43.5 |
| 48 | ------ | 84.2 | 70.5 | 61.9 | 59.9 | ------ |
| 120 | ------ | 81.4 | 73.1 | ------ | 60.8 | ------ |
| 264 | 75.2 | 76.5 | 71.2 | 65.2 | 64.6 | ------ |

C. 0.25" rod-solution heat treated at 1000° C. for 1 hour, quenched, cold drawn to 0.081" wire and tested.

| Zirconium Content (percent) | Tensile Strength (p. s. i.) | Elongation (percent in 2") | Hardness (VPN) | Electrical Conductivity (percent) |
|---|---|---|---|---|
| 0.15 | 59,700 | 2.6 | 131 | ---------- |
| 0.13 | 59,700 | 2.6 | 135 | ---------- |
| 0.10 | 59,700 | 3.0 | ---------- | 65.1 |
| 0.07 | 55,100 | 3.00 | 119 | 72.3 |
| 0.019 | 52,400 | 3.0 | 117 | 83.9 |
| 0.011 | 52,600 | 3.0 | 113 | 90.8 |
| 0.003 | 54,300 | 3.0 | 109 | 95.4 |

D. 0.25" rod-solution heat treated at 980° C. for 1 hour, quenched, cold drawn to 0.081" wire, precipitation heat treated at 350° C. for one hour, quenched and tested.

| Zirconium Content (percent) | Tensile Strength (p. s. i.) | Elongation (percent in 2") | Hardness (VPN) | Electrical Conductivity (percent) |
|---|---|---|---|---|
| 0.15 | 69,700 | 9.6 | 153 | ---------- |
| 0.13 | 68,500 | 9.6 | ---------- | ---------- |
| 0.10 | 63,000 | 10.4 | 137 | 80.1 |
| 0.07 | 60,000 | 8.8 | 158 | 84.8 |
| 0.019 | 54,400 | 7.0 | 119 | 90.3 |
| 0.011 | 51,400 | 7.0 | 115 | 94.0 |
| 0.003 | 32,000 | 35.0 | 55 | 97.7 |

E. 0.25" rod-treated as in (D) excepting that the precipitation heat treatment was at 500° C. for 1 hour.

| Zirconium Content (percent) | Tensile Strength (p. s. i.) | Elongation (percent in 2") | Hardness (VPN) | Electrical Conductivity (percent) |
|---|---|---|---|---|
| 0.15 | 61,500 | 9.0 | 146 | ---------- |
| 0.13 | 61,500 | 8.5 | 139 | ---------- |
| 0.10 | 57,200 | 9.0 | 132 | 89.3 |
| 0.07 | 55,200 | 10.0 | 128 | 91.0 |
| 0.019 | 45,600 | 12.0 | 103 | 95.3 |
| 0.011 | 32,000 | 39.6 | 63 | 98.1 |
| 0.003 | 32,000 | 37.4 | 46 | 97.9 |

F. 0.25" rod-treated as in (D) excepting that the precipitation heat treatment was at 600° C. for one hour.

| Zirconium Content (percent) | Tensile Strength (p. s. i.) | Elongation (percent in 2") | Hardness (VPN) | Electrical Conductivity (percent) |
|---|---|---|---|---|
| 0.10 | 37,800 | 26.0 | 80 | 94.6 |
| 0.07 | 33,900 | 34.6 | 65 | 96.2 |
| 0.019 | 32,000 | 39.0 | 52 | 97.4 |
| 0.011 | 32,000 | 39.0 | 52 | 97.7 |
| 0.003 | 32,000 | 34.0 | 46 | 97.7 |

It is apparent that many differing embodiments of this invention may be made without departing from the spirit and scope thereof and it is not intended to be limited except as indicated in the appended claims.

We claim:

1. A copper base alloy of improved electrical conductivity and superior resistance to softening at elevated temperatures consisting of initially oxygen-free copper to which is added from 0.003 to 0.15% by weight of zirconium.

2. A high electrical conductivity alloy resistant to softening at temperatures of about 500° C. consisting of initially oxygen-free copper containing from 0.02 to 0.10% by weight of zirconium, said alloy having improved hot and cold workability characteristics compared to copper-zirconium alloys of higher zirconium content and further characterized in that only a single phase is formed by solution heat treatment at 700 to 900° C.

3. A copper-zirconium alloy suitable for use at elevated temperatures, said alloy being characterized by the presence of from 0.01 to 0.10% by weight of zirconium in initially oxygen-free copper, and further characterized by the attainment of maximum hardness and electrical conductivity by solution heat treating between 700 and 1000° C. for a period of time sufficient to solubilize all of the zirconium followed by quenching, cold working the material and thereafter precipitation heat treating the same at about 350° C. for approximately one hour.

4. A heat treatable copper-zirconium alloy possessing the combination of suitable hardness, electrical conductivity and resistance to softening at temperatures of about 500° C. comprising from 0.10 to 0.15% by weight of zirconium with the balance being substantially initially oxygen-free copper, said alloy being characterized by the attainment of maximum resistance to softening at elevated temperatures by solution heat treatment at about 980° C. for a period of time sufficient to solubilize all of the zirconium followed by precipitation heat treatment at about 500° C. for about an hour.

5. A copper-zirconium alloy of improved electrical conductivity suitable for the fabrication of electrical and electronic components requiring the property of resistance to softening at relatively high temperatures consisting of initially oxygen-free copper containing up to 0.10% by weight of zirconium, said alloy being characterized by an electrical conductivity of about 90% I. A. C. S. or higher upon appropriate treatment.

6. A copper base alloy of improved fabrication qualities suitable for providing high electrical conductivity materials having increased resistance to softening at elevated temperatures consisting of initially oxygen-free copper containing within the maximum solid solubility limit of zicronium not in excess of 0.15% by weight, said zirconium being substantially entirely dissolved in the copper upon solution heat treatment of the alloy between 700 and 1000° C.

7. A copper base alloy of high electrical conductivity and improved resistance to softening at elevated temperatures consisting of a small but measurable amount of zirconium less than 0.1% by weight, balance initially oxygen-free copper.

8. A copper base alloy suitable for fabricating commutator segments and other electrical components requiring the combination of properties consisting of high electrical conductivity, sufficient strength and resistance to softening at temperatures above 500° C. consisting of from .02 to .07% by weight zirconium, balance oxygen-free copper, said alloy being characterized by an electrical conductivity not below 85% I. A. C. S. and a softening temperature of at least 520° C.

References Cited in the file of this patent

UNITED STATES PATENTS

| | | |
|---|---|---|
| 2,097,816 | Hensel et al. | Nov. 2, 1937 |
| 2,172,968 | De Boer | Sept. 12, 1939 |
| 2,331,088 | Went et al. | Oct. 5, 1943 |
| 2,479,311 | Christensen et al. | Aug. 16, 1949 |

OTHER REFERENCES

The Journal of the Institute of Metals, No. 1 (1928), vol. XXXIX (pages 173–176).